(12) United States Patent
Osada

(10) Patent No.: US 9,664,244 B2
(45) Date of Patent: May 30, 2017

(54) DISK BRAKE, PAD, AND PAIR OF SHIMS

(71) Applicant: HITACHI AUTOMOTIVE SYSTEMS, LTD., Hitachinaka-shi, Ibaraki (JP)

(72) Inventor: Takahito Osada, Nishiyatsushiro-gun (JP)

(73) Assignee: HITACHI AUTOMOTIVE SYSTEMS, LTD., Hitachinaka-shi, Ibaraki (JP)

(*) Notice: Subject to any disclaimer, the term of this patent is extended or adjusted under 35 U.S.C. 154(b) by 0 days.

(21) Appl. No.: 14/730,701

(22) Filed: Jun. 4, 2015

(65) Prior Publication Data
US 2015/0354646 A1 Dec. 10, 2015

(30) Foreign Application Priority Data
Jun. 9, 2014 (JP) .................. 2014-118783

(51) Int. Cl.
*F16D 65/38* (2006.01)
*F16D 65/097* (2006.01)
*F16D 55/225* (2006.01)
*F16D 65/00* (2006.01)
*F16D 55/2265* (2006.01)

(52) U.S. Cl.
CPC ....... *F16D 65/0971* (2013.01); *F16D 55/225* (2013.01); *F16D 55/2265* (2013.01); *F16D 65/0006* (2013.01)

(58) Field of Classification Search
CPC ............ F16D 65/0971; F16D 65/0006; F16D 65/097; F16D 65/0979
USPC ............................. 188/73.37, 258; D12/180
See application file for complete search history.

(56) References Cited

U.S. PATENT DOCUMENTS

| 5,975,252 | A | * | 11/1999 | Suzuki | F16D 55/227 |
| | | | | | 188/1.11 W |
| 6,116,384 | A | * | 9/2000 | Matsumoto | F16D 65/0006 |
| | | | | | 188/250 D |
| 6,298,956 | B1 | * | 10/2001 | Gerhardt | F16D 65/092 |
| | | | | | 188/73.35 |
| 2006/0027427 | A1 | * | 2/2006 | Anda | F16D 65/0006 |
| | | | | | 188/73.1 |
| 2006/0157307 | A1 | * | 7/2006 | Tsurumi | F16D 65/0971 |
| | | | | | 188/250 G |
| 2008/0190716 | A1 | * | 8/2008 | Bosco | F16D 65/092 |
| | | | | | 188/73.37 |
| 2012/0298457 | A1 | * | 11/2012 | Ogawa | F16D 65/095 |
| | | | | | 188/72.4 |

(Continued)

FOREIGN PATENT DOCUMENTS

JP 2006-046561 2/2006

*Primary Examiner* — Nicholas J Lane
(74) *Attorney, Agent, or Firm* — Nixon & Vanderhye P.C.

(57) ABSTRACT

A pad includes: a lining; a plate; a first shim installed at a surface of the plate which is opposite to the lining; and a second shim installed at a surface of the first shim which is opposite to the plate, a first hook overhanging at an outer circumferential edge section of the plate and hooked to the outer circumferential edge section of the plate is formed at the first shim, a second hook is formed at the second shim at an outer side of the first hook in a disk radial direction, and the second hook is configured to be hooked to a part of the plate with which the first hook does not come in contact.

15 Claims, 8 Drawing Sheets

(56) References Cited

U.S. PATENT DOCUMENTS

| | | | | |
|---|---|---|---|---|
| 2013/0025982 A1* | 1/2013 | Suzuki | ................ | F16D 65/0979 188/72.4 |
| 2014/0339028 A1* | 11/2014 | Kobayashi | ............ | F16D 65/092 188/250 B |
| 2014/0360822 A1* | 12/2014 | Kobayashi | ............ | F16D 65/095 188/250 E |

* cited by examiner

DISK BRAKE, PAD, AND PAIR OF SHIMS

BACKGROUND OF THE INVENTION

Field of the Invention

The present invention relates to a disk brake configured to brake a vehicle, and a pad and a pair of shims used for the same.

Priority is claimed on Japanese Patent Application No. 2004-118783, filed Jun. 9, 2014, the content of which is incorporated herein by reference.

Description of Related Art

There is a pad including a shim provided at a pad for a disk brake (for example, see Japanese Unexamined Patent Application, First Publication No. 2006-46561)

In work of dealing with a pad independently, such as exchange work or the like, when a shim is provided at the pad, there is a need to carefully perform the work such that the shim does not drop from the pad. For this reason, when a structure in which the shim is easily dropped from the pad is provided, working efficiency may be decreased.

SUMMARY OF THE INVENTION

The present invention provides a disk brake capable of suppressing a shim from being dropped from a pad, and a pad and a pair of shims used for the same.

According to a first aspect of the present invention, a disk brake includes: a support member disposed so as to astride an outer circumferential side of a disk; a pair of pads supported by the support member and disposed to face surfaces of the disk; and a pressing mechanism configured to press the pair of pads against the disk, wherein the pad includes: a lining configured to contact with the disk; a plate installed at a surface of the lining which is opposite to the disk; a first shim installed at a surface of the plate which is opposite to the lining; and a second shim installed at a surface of the first shim which is opposite to the plate, a first hook overhanging at an outer circumferential edge section of the plate and hooked to the outer circumferential edge section of the plate is formed at the first shim, a second hook is formed at the second shim at an outer side of the first hook in a disk radial direction, and the second hook is configured to be hooked to a part of the plate with which the first hook does not come in contact.

According to a second aspect of the present invention, the second hook is formed to astride the first hook, and hooked to a corner section of the plate at the lining side.

According to a third aspect of the present invention, the second hook is formed to astride the first hook, and hooked to a surface of the plate at the lining side.

According to a fourth aspect of the present invention, the first hook is divided into two divided sections, and the second hook is disposed between the two divided sections.

According to a fifth aspect of the present invention, a contact type sensor is installed at the plate and is configured to come in contact with the disk to generate a warning sound when the lining is abraded and a distance between the disk and the plate in an disk axial direction arrives at a predetermined value, and a front end section position of the second hook in the disk axial direction is disposed closer to the plate than a front end section position of the contact type sensor.

According to a sixth aspect of the present invention, the second hook is installed at a central position of the pad in a disk tangential direction.

According to a seventh aspect of the present invention, a width dimension W1 of the second hook in the disk tangential direction is set to be smaller than a width dimension W2 of a cutout portion in the disk tangential direction, and the second hook is hooked within a range of the cutout portion, the cutout portion being formed at the outer circumferential edge section of the plate.

According to an eighth aspect of the present invention, sliding restriction sections configured to abut the support member in the disk tangential direction and configured to restrict sliding of the second shim are installed at both sides of the second shim in the disk tangential direction, and a width dimension W3 between the sliding restriction sections, a width dimension W4 between abutting surfaces formed in the disk tangential direction at both sides of the pad abutting with the support member in the disk tangential direction, the width dimension W1 of the second hook, and the width dimension W2 of the cutout portion satisfy a relation of $(W2-W1) \geq (W4-W3)$.

According to a ninth aspect of the present invention, metal surfaces of the first shim and the second shim come in contact with each other.

According to a tenth aspect of the present invention, the first hook is divided into two divided sections, and the second hook is disposed between the two divided sections.

According to an eleventh aspect of the present invention, a contact type sensor is installed at the plate and is configured to come in contact with the disk to generate a warning sound when the lining is abraded and a distance between the disk and the plate in the disk axial direction arrives at a predetermined value, and a front end section position of the second hook in the disk axial direction is disposed closer to the plate than the front end section position of the contact type sensor.

According to a twelfth aspect of the present invention, the second hook is installed at a central position of the pad in the disk tangential direction.

According to a thirteenth aspect of the present invention, the width dimension W1 of the second hook in the disk tangential direction is set to be smaller than the width dimension W2 of the cutout portion in the disk tangential direction, and the second hook is hooked within a range of the cutout portion, the cutout portion being formed at the outer circumferential edge section of the plate.

According to a fourteenth aspect of the present invention, sliding restriction sections configured to abut the support member in the disk tangential direction and configured to restrict sliding of the second shim are installed at both sides of the second shim in the disk tangential direction, and wherein a width dimension W3 between the sliding restriction sections, a width dimension W4 between abutting surfaces formed in the disk tangential direction at both sides of the pad abutting with the support member in the disk tangential direction, the width dimension W1 of the second hook, and the width dimension W2 of the cutout portion satisfy a relation of $(W2-W1) \geq (W4-W3)$.

According to a fifteenth aspect of the present invention, metal surfaces of the first shim and the second shim come in contact with each other.

According to a sixteenth aspect of the present invention, a pad includes a lining configured to contact with a disk; a plate installed at a surface of the lining which is opposite to the disk; a first shim installed at a surface of the plate which is opposite to the lining; and a second shim installed at a surface of the first shim which is opposite to the plate, wherein a first hook overhanging at an outer circumferential edge section of the plate and hooked to the outer circumferential edge section of the plate is formed at the first shim, a second hook is formed at the second shim at an outer side of the first hook in a disk radial direction, and the second hook is configured to be hooked to a part of the plate with which the first hook does not come in contact.

According to a seventeenth aspect of the present invention, a pair of shims for covering a plate which is installed at a surface of a lining, the lining being configured to be in contact with the disk and the surface of the lining being opposite to a disk, wherein the pair of shims having a first shim installed at a surface of the plate which is opposite to the lining, and a second shim installed at a surface of the first shim which is opposite to the plate, a first hook overhanging at an outer circumferential edge section of the plate and hooked to the outer circumferential edge section of the plate is formed at the first shim, a second hook is formed at the second shim at an outer side of the first hook in a disk radial direction, and the second hook is configured to be hooked to a part of the plate with which the first hook does not come in contact.

According to the aspects of the present invention, it is possible to provide a disk brake capable of suppressing the shim from being dropped from the pad, and a pad and a pair of shims used for the same.

DETAILED DESCRIPTION OF THE INVENTION

[First Embodiment]

A first embodiment according to the present invention will be described below with reference to FIGS. 1 to 6. A disk brake 10 of the first embodiment is provided for a vehicle such as an automobile or the like, specifically, a four-wheeled automobile. The disk brake 10 brakes the vehicle by stopping rotation of a disk 11 shown in FIG. 1 rotated with a wheel (not shown).

Figure 1:
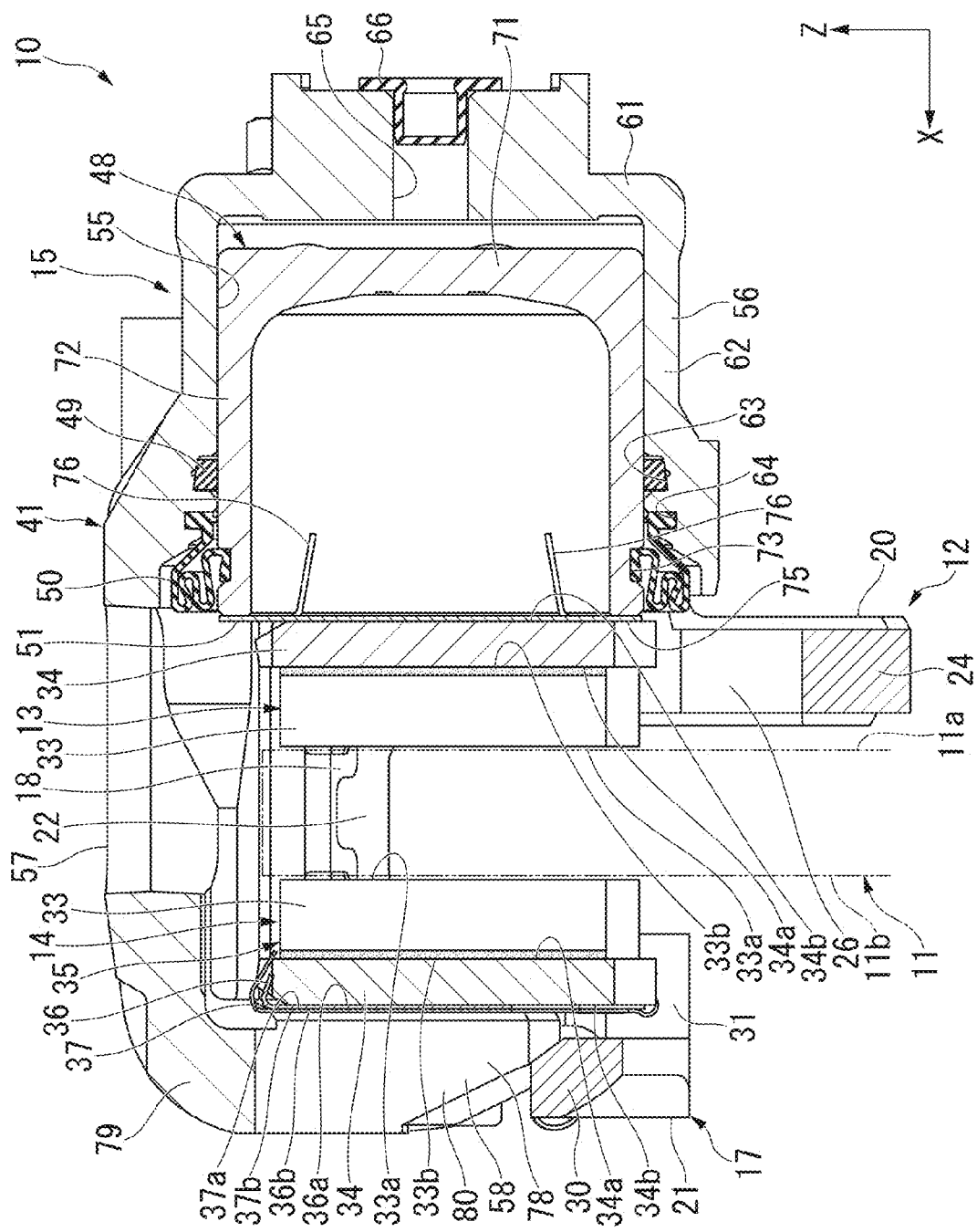
FIG. 1 is a cross-sectional view showing a disk brake of a first embodiment.
Figure 2:
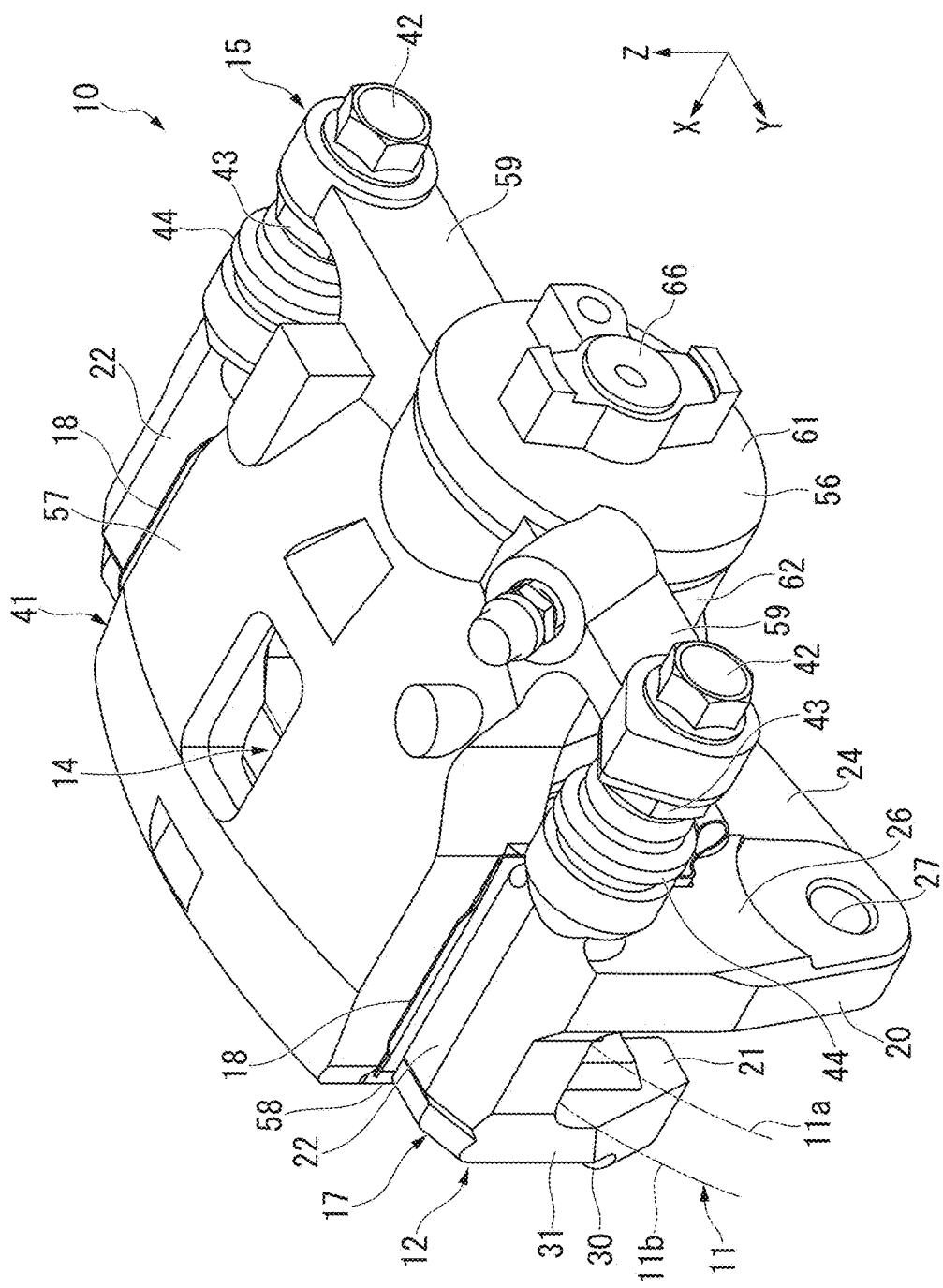
FIG. 2 is a perspective view showing the disk brake of the first embodiment.

The disk brake 10 includes a support member 12, a pair of pads 13 and 14, and a pressing mechanism 15. The support member 12 is disposed to astride an outer circumferential side of the disk 11 to be fixed to a non-rotation section of the vehicle as shown in FIG. 2. The pair of pads 13 and 14 shown in FIG. 1 is disposed to face surfaces 11a and 11b of the disk 11 while being supported by the support member 12. The pressing mechanism 15 sandwiches the pair of pads 13 and 14 to press the pads 13 and 14 against both of the surfaces 11a and 11b of the disk 11.

Hereinafter, it will be described using three directions that differ by 90°, i.e., a disk axial direction X, a disk tangential direction Y, and a disk radial direction Z. The disk axial direction X is a direction parallel to a central axis of the disk 11. The disk tangential direction Y is a direction parallel to a tangential line at an intersection position between a surface including a central axis of the disk 11 and centers of the pads 13 and 14, and an outer circumferential surface of the disk 11. The disk radial direction Z is a direction parallel to a line in a radial direction which passes a center of the pad 13 or the pad 14 and which is perpendicular to the central axis of the disk 11. In the disk radial direction Z, a central axis side of the disk 11 is referred to as an inside and an opposite side of the central axis of the disk 11 is referred to as an outerside.

As shown in FIG. 2, the support member 12 is constituted by a carrier 17 and a pair of pad guides 18 and 18 attached to the carrier 17. The carrier 17 is disposed to astride the outer circumferential side of the disk 11 to be attached to the non-rotation section of the vehicle. The carrier 17 is an integrally formed product having an inner side disposition section 20, an outer side disposition section 21, and a pair of connecting sections 22 and 22. The inner side disposition section 20 is disposed to face the surface 11a of an inner side thereof (inside in the vehicle width direction) with respect to the disk 11. The outer side disposition section 21 is disposed to face the surface 11b of the outer side thereof (outer side in the vehicle width direction) with respect to the disk 11 and to be spaced apart from the inner side disposition section 20. The pair of connecting sections 22 and 22 is disposed to be spaced apart from each other in the disk tangential direction Y, and both of the connecting sections 22 and 22 connect the inner side disposition section 20 and the outer side disposition section 21 while astriding the outer circumferential side of the disk 11 in the disk axial direction X.

The inner side disposition section 20 has an attachment base section 24 extending in the disk tangential direction Y. In addition, the inner side disposition section 20 has a pair of inner side pad support sections 26 and 26, one of which is shown in FIG. 2 and the other of which is shown in FIG. 1. The pair of inner side pad support sections 26 and 26 extend outward in the disk radial direction Z from both end sections of the attachment base section 24 in the disk tangential direction Y. End sections of the pair of inner side pad support sections 26 and 26 opposite to the attachment base section 24 are connected to the connecting sections 22 and 22. While only one is shown in FIG. 2, two attachment holes 27 are formed in the inner side disposition section 20 at both ends in the disk tangential direction Y of the attachment base section 24. The carrier 17 is fixed to the non-rotation section of the vehicle by fasteners (bolts) screwed into the attachment holes 27.

The outer side disposition section 21 has an outer beam section 30 shown in FIG. 1 extending in the disk tangential direction Y. In addition, the outer side disposition section 21 has a pair of outer side pad support sections 31 and 31, one of which is shown in FIG. 1 and the other of which is shown in FIG. 2. The pair of outer side pad support sections 31 and 31 extends outward in the disk radial direction Z from both end sections of the outer beam section 30 in the disk tangential direction Y. End sections of the pair of outer side pad support sections 31 and 31 opposite to the outer beam section 30 is connected to the connecting sections 22 and 22.

The pair of pad guides 18 and 18 is mounted on the pair of connecting sections 22 and 22, the pair of inner side pad support sections 26 and 26 and the pair of outer side pad support sections 31 and 31. That is, as shown in FIG. 2, the one pad guide 18 is attached to the connecting section 22, the inner side pad support section 26 and the outer side pad support section 31, all of which are on the same side in the disk tangential direction Y. In addition, as shown in FIG. 1, the other pad guide 18 is attached to the connecting section 22, the inner side pad support section 26 and the outer side pad support section 31, all of which are on opposite sides in the disk tangential direction Y.

The pair of pads 13 and 14 shown in FIG. 1 is movably supported by the support member 12 in the disk axial direction X. The one pad 13 is disposed at an inner side (inside in the vehicle width direction) of the disk 11. In the inner side pad 13, both end sections in the disk tangential direction Y are supported by the pair of inner side pad support sections 26 and 26, one of which is shown in FIG. 2 and the other of which is shown in FIG. 1, via the pair of pad guides 18 and 18 shown in FIG. 2.

As shown in FIG. 1, the other pad 14 is disposed at the outer side (outer side in the vehicle width direction) of the disk 11. Both end sections of the pad 14 in the disk tangential direction Y are supported by the pair of outer side pad support sections 31 and 31, one of which is shown in FIG. 2 and the other of which is shown in FIG. 1, via the pair of pad guides 18 and 18 shown in FIG. 2.

As shown in FIG. 1, the inner side pad 13 is constituted by a lining 33 and a plate 34. The lining 33 comes in contact with the disk 11 in a surface 33a. The plate 34 is installed at the surface 33b opposite to the surface 33a of the lining 33. A surface 34a of the lining 33 side of the plate 34 and a surface 33b of the plate 34 side of the lining 33 are fixed to each other. Accordingly, the inner side pad 13 is configured to be integrally formed with the lining 33 and the plate 34. In the inner side pad 13, a surface 34b of the plate 34 opposite to the lining 33 comes in contact with the pressing mechanism 15. In the inner side pad 13, both end sections of the plate 34 in the disk tangential direction Y are supported by the support member 12. The inner side pad 13 comes in contact with the disk 11 in the surface 33a of the lining 33 by being pressed by the pressing mechanism 15.

The outer side pad 14 has a pad main body 35, which is a common part with the inner side pad 13. The pad main body 35 also comes in contact with the disk 11 in the surface 33a. The plate 34 is installed at the surface 33b of the pad main body 35 opposite to the surface 33a. The surface 34a at the lining 33 side of the plate 34 and the surface 33b at the plate 34 side of the lining 33 are fixed to each other. Accordingly, the pad main body 35 of the pad 14 at the outer side is configured to be integrally formed with the lining 33 and the plate 34. Also in the pad main body 35, both end sections of the plate 34 in the disk tangential direction Y are supported by the support member 12.

The outer side pad 14 includes the pad main body 35, a first shim 36, and a second shim 37. The first shim 36 is installed at the surface 34b opposite to the surface 34a in contact with the lining 33 of the plate 34 of the pad main body 35. The first shim 36 comes in contact with the surface 34b of the plate 34 in a surface 36a. The second shim 37 is installed at a surface 36b opposite to the surface 36a of the first shim 36. The second shim 37 comes in contact with the surface 36b of the first shim 36 in a surface 37a. A surface 37b opposite to the surface 37a of the second shim 37 comes in contact with the pressing mechanism 15. The outer side pad 14 comes in contact with the disk 11 in the surface 33a of the pad main body 35 as the surface 37b of the second shim 37 is pressed by the pressing mechanism 15.

As shown in FIG. 2, the pressing mechanism 15 is disposed to astride the outer circumferential side of the disk 11 in the disk axial direction X to be movably attached to the support member 12 in the disk axial direction X. The pressing mechanism 15 has a caliper body 41, a pair of bolts 42 and 42 attached to both end sections of the caliper body 41 in the disk tangential direction Y, a pair of slide pins 43 and 43 attached to the caliper body 41 by the pair of bolts 42 and 42, and a pair of pin boots 44 and 44 configured to cover the pair of slide pins 43 and 43.

The pair of slide pins 43 and 43 is fitted into support holes (not shown) formed in the disk axial direction X at the pair of connecting sections 22 and 22 of the carrier 17 to be slidable in the disk axial direction X. Accordingly, the caliper body 41 fixed to the slide pins 43 and 43 is movable in the disk axial direction X together with the slide pins 43 and 43.

The pair of pin boots 44 and 44 expands and contracts according to a variation in projection amount from the support holes (not shown) by movement of the pair of slide pins 43 and 43. Accordingly, the pair of pin boots 44 and 44 normally covers portions of the slide pins 43 and 43 exposed from the carrier 17.

As shown in FIG. 1, the pressing mechanism 15 has a piston 48, a piston seal 49, a piston boot 50, and a pressing plate 51. The piston 48 is slidably installed at the inner side (inside in the vehicle width direction) of the caliper body 41, and installed at one side of the pressing mechanism 15 in the disk axial direction X. The piston seal 49 seals a gap between the caliper body 41 and the piston 48. The piston boot 50 is connected to the caliper body 41 and the piston 48 to cover a portion of the piston 48 exposed from the caliper body 41.

The caliper body 41 has a cylinder section 56, a bridge section 57, and a claw portion 58. A bore 55 into which the piston 48 is slidably fitted is formed in the cylinder section 56. The bridge section 57 extends in the disk axial direction X from an outside position of the cylinder section 56 in the disk radial direction Z to astride the outer circumference of the disk 11. The claw portion 58 extends inward in the disk radial direction Z from an opposite side of the bridge section 57 with respect to the cylinder section 56 to face the cylinder section 56. In other words, the bridge section 57 connects the cylinder section 56 and the claw portion 58. In addition, as shown in FIG. 2, the caliper body 41 has a pair of extension sections 59 and 59. The pair of extension sections 59 and 59 extends from the cylinder section 56 toward both sides in the disk tangential direction Y, and the above-mentioned slide pins 43 and 43 are attached to the distal end side by the pair of bolts 42 and 42. The caliper body 41 is an integrally formed product constituted by the cylinder section 56, the bridge section 57, the claw portion 58 and the pair of extension sections 59 and 59 through casting.

As shown in FIG. 1, the bore 55 is formed in the cylinder section 56 in the disk axial direction X to be opened at the claw portion 58 side. Accordingly, the cylinder section 56 has a bottom section 61 opposite to the claw portion 58, and a cylindrical section 62 extending from the outer circumferential edge section of the bottom section 61 toward the claw portion 58 to form a cylindrical shape. That is, the cylinder section 56 forms a bottomed cylindrical shape. An annular piston seal groove 63 is formed in the inner circumferential surface of the bore 55 at an intermediate position in the disk axial direction X. In addition, an annular boot support groove 64 is formed in the inner circumferential surface of the bore 55 at the end section of the claw portion 58 side. The piston seal 49 is fitted into the piston seal groove 63, and thus the piston seal 49 is supported by the cylinder section 56. A through-hole 65 passing in the disk axial direction X is formed in the bottom section 61 of the cylinder section 56. The through-hole 65 is closed by the cap 66 which is removed upon assembly to the vehicle.

The piston 48 is formed in a bottomed cylindrical shape having a bottom section 71 and a cylindrical section 72 extending from the outer circumferential edge section of the bottom section 71 to form a cylindrical shape. An annular boot support groove 73 is formed at an outer circumferential section of the cylindrical section 72 opposite to the bottom section 71. The piston 48 is fitted into the bore 55 and the piston seal 49 in a posture in which the bottom section 71 is disposed at an inner side (the bottom section 61 side) of the bore 55. The piston seal 49 seals a gap between the cylinder section 56 and the piston 48.

The piston boot 50 has one end side fitted into the boot support groove 64 of the cylinder section 56 to be connected to the cylinder section 56, and the other side fitted into the boot support groove 73 of the piston 48 to be connected to the piston 48.

The pressing plate 51 is attached to the piston 48. The pressing plate 51 has a cover plate section 75 configured to cover an end surface of the cylindrical section 72 opposite to the bottom section 71, and a pair of locking claws 76 and 76 extending from the cover plate section 75 to be locked to the inner circumferential surface of the cylindrical section 72.

While supported by the cylinder section 56, the end surface of the cylindrical section 72 of the piston 48 opposite to the bottom section 71 faces the claw portion 58. The piston 48 slides in the cylinder section 56 in the disk axial direction X. The piston 48 faces opposite to the disk 11 at the side of the inner side pad 13, and presses the inner side pad 13 via the pressing plate 51.

A recess 78 concaved outward in the disk radial direction Z from the end section inside in the disk radial direction Z is formed in the claw portion 58. The recess 78 is a portion through which a tool configured to process the inside of the bore 55 passes. Accordingly, the recess 78 matches positions in both the disk tangential direction Y and the disk radial direction Z about a center of the bore 55, i.e., the piston 48. The claw portion 58 has a base section 79 at the bridge section 57 side, and a pair of projection sections 80 protruding inward in the disk radial direction Z from both sides of the base section 79 in the disk tangential direction Y, although only one is shown in FIG. 1. The claw portion 58 faces opposite to the disk 11 at a side of the outer side pad 14, and presses the outer side pad 14 with the end surface of the claw portion 58 which is at the cylinder section 56 side.

In the pressing mechanism 15, when a brake fluid is introduced into the bore 55 of the cylinder section 56 from the through-hole 65, the piston 48 advances toward the disk 11 in the disk axial direction X. Then, the piston 48 presses the plate 34 of the inner side pad 13 toward the disk 11 via the cover plate section 75 of the pressing plate 51. Accordingly, the pad 13 moves on the pair of inner side pad support sections 26 and 26 of the carrier 17, one of which is shown in FIG. 2 and the other of which is shown in FIG. 1, in the disk axial direction X via the pad guides 18 and 18 shown in FIG. 2. According to the movement, the pad 13 brings the surface 33a of the lining 33 in contact with the surface 11a of the disk 11.

In addition, according to a reactive force of the pressing, the pressing mechanism 15 moves toward the inner side in the disk axial direction X with respect to the carrier 17 via the pair of slide pins 43 and 43 shown in FIG. 2, the outer side pad 14 is pressed toward the disk 11 at the end surface of the claw portion 58 which is at the disk 11 side as shown in FIG. 1. Accordingly, the pad 14 moves on the pair of outer side pad support sections 31 and 31 of the carrier 17, one of which is shown in FIG. 2 and the other of which is shown in FIG. 1, in the disk axial direction X via the pad guides 18 and 18 shown in FIG. 2. According to the movement, the pad 14 brings the surface 33a of the lining 33 shown in FIG. 1 in contact with the surface 11b of the disk 11.

As described above, the pressing mechanism 15 sandwiches the pair of pads 13 and 14 from both sides thereof with the piston 48 and the claw portion 58 and presses the pads 13 and 14 against both of the surfaces 11a and 11b of the disk 11 by an operation of the piston 48. As a result, the pressing mechanism 15 applies a frictional resistance to the disk 11 to generate a braking force. Here, the support member 12 receives a braking torque of the pad 13 at the inner side disposition section 20 of the carrier 17 via the pad guide 18, and the support member 12 receives the braking torque of the pad 14 at the outer side disposition section 21 of the carrier 17 via the pad guide 18.

Figure 3:
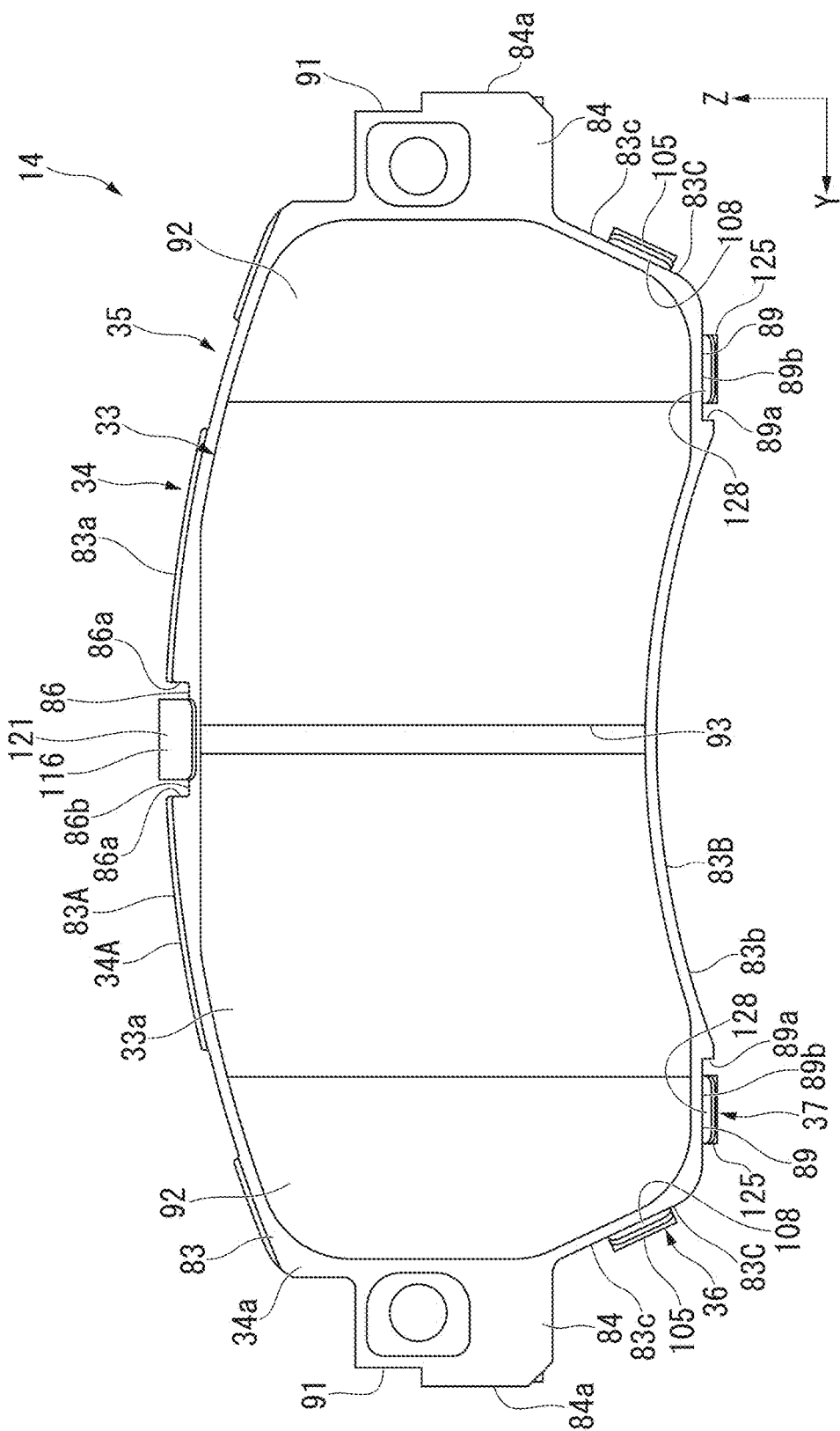
FIG. 3 is a front view showing a pad of the disk brake of the first embodiment.

As shown in FIG. 3, the pad main body 35 forms a mirror symmetrical shape with about a surface which is perpendicular to the disk tangential direction Y and which passes through a center of the pad main body 35 in the disk tangential direction Y. The plate 34 of the pad main body 35 has a main plate section 83, and a pair of convex sections 84 and 84. The lining 33 is joined to the main plate section 83 of the plate 34. The pair of convex sections 84 and 84 protrudes outward in the disk tangential direction Y from the intermediate positions in the disk radial direction Z of both end sections in the disk tangential direction Y of the main plate section 83. The pair of convex sections 84 and 84 of the pad main body 35 is supported by the support member 12 shown in FIG. 2.

Figure 4:
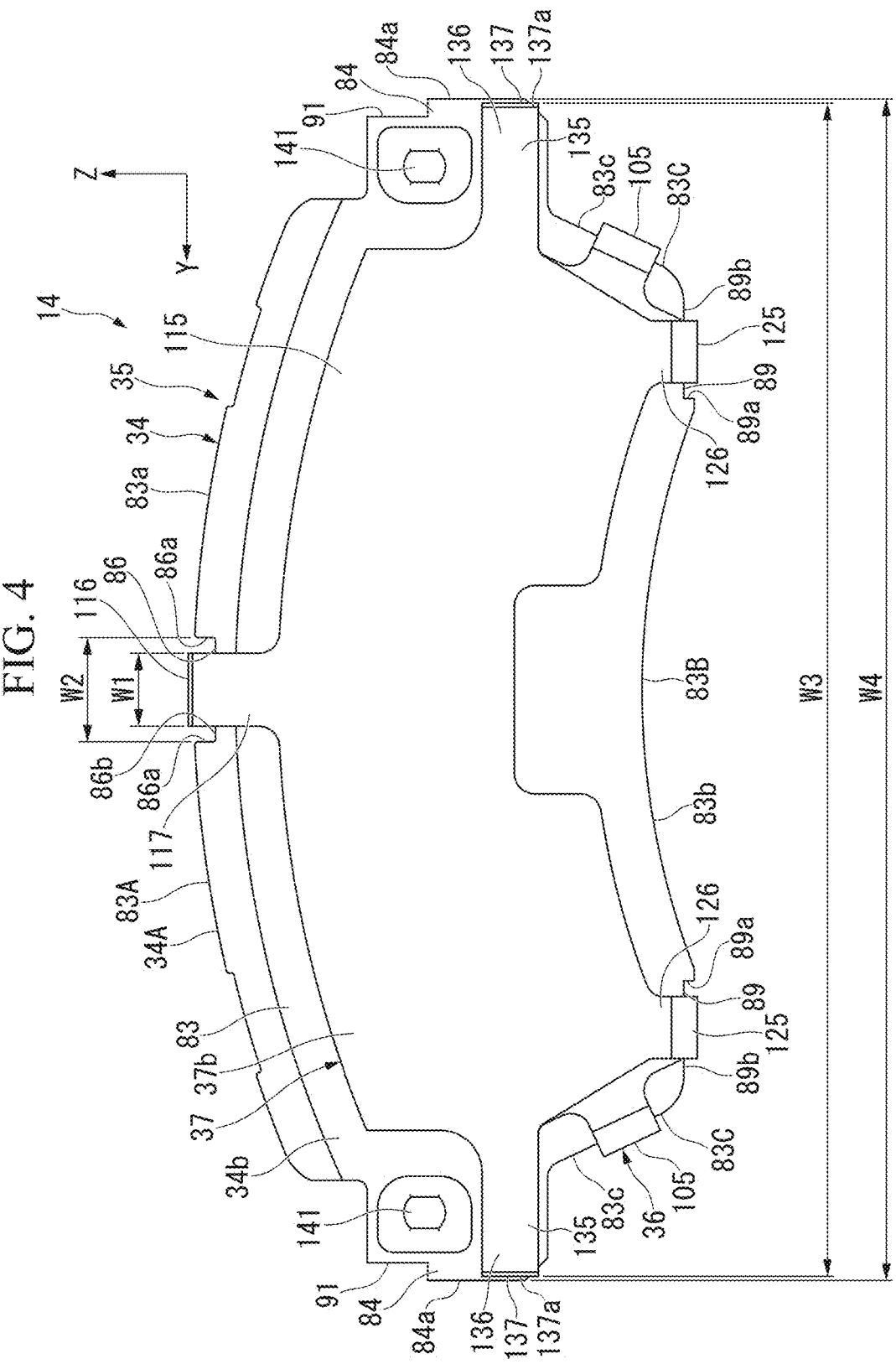
FIG. 4 is a rear view showing the pad of the disk brake of the first embodiment.

As shown in FIGS. 3 and 4, an end surface 83a of the main plate section 83 which locates at the outer side in the disk radial direction Z forms a shape having a central part of the end surface 83a to be expanded at the outer side in the disk radial direction Z as being closer to the center of the end surface 83a in the disk tangential direction Y. In an outer circumferential edge section 34A of the plate 34, a cutout portion 86 concaved inward in the disk radial direction Z is formed at an end edge section 83A which is located at the outer side in the disk radial direction Z and which includes the end surface 83a of the main plate section 83. The cutout portion 86 is formed at a center of the end edge section 83A in the disk tangential direction Y and at a center of the plate 34 in the disk tangential direction Y. The cutout portion 86 has a pair of wall surfaces 86a and 86a formed in the disk radial direction Z, and a bottom surface 86b formed in the disk tangential direction Y between the wall surfaces 86a and 86a. The wall surfaces 86a and 86a and the bottom surface 86b are also formed in the disk axial direction X. Accordingly, the wall surfaces 86a and 86a of the cutout portion 86 are perpendicular to the disk tangential direction Y, and the bottom surface 86b of the cutout portion 86 is perpendicular to the disk radial direction Z.

In the outer circumferential edge section 34A of the plate 34, a pair of stepped sections 89 and 89 concaved outward in the disk radial direction Z is formed at an end edge section 83B which is disposed at an inner side in the disk radial direction Z and which includes an end surface 83b of the main plate section 83 which is disposed at an inner side in the disk radial direction Z. The pair of stepped sections 89 and 89 is formed at both end sections of the end edge section 83B in the disk tangential direction Y. The stepped sections 89 and 89 each have a wall surface 89a formed in the disk radial direction Z, and a stepped surface 89b formed in the disk tangential direction Y. In the pair of stepped sections 89 and 89, the pair of wall surfaces 89a and 89a is disposed at a side at which the pair of stepped sections 89 and 89 is closer to each other, and the pair of stepped surfaces 89b and 89b is disposed at a side at which the pair of stepped sections 89 and 89 is more spaced apart from each other. The wall surfaces 89a and 89a and the stepped surfaces 89b and 89b are formed in the disk axial direction X. Accordingly, the pair of wall surfaces 89a and 89a is perpendicular to the disk tangential direction Y, and the pair of stepped surfaces 89b and 89b is perpendicular to the disk radial direction Z. The pair of stepped surfaces 89b and 89b is disposed on the same plane.

A pair of side surfaces 83c and 83c further outside in the disk tangential direction Y than the pair of stepped sections 89 and 89 of the main plate section 83 is disposed further inside in the disk radial direction Z than the pair of convex sections 84 and 84. The pair of side surfaces 83c and 83c is inclined with respect to the disk radial direction Z such that a distance in the disk tangential direction Y is more increased in the outer side in the disk radial direction Z.

A pair of end surfaces (abutting surfaces) 84a and 84a of both ends of the pair of convex sections 84 and 84 in the disk tangential direction Y is disposed at both ends of the plate 34 in the disk tangential direction Y. The pair of end surfaces 84a and 84a is formed in the disk radial direction Z and in the disk axial direction X. In other words, the pair of end surfaces 84a and 84a is perpendicular to the disk tangential direction Y. A pair of stepped sections 91 and 91 is formed at the pair of convex sections 84 and 84 further outside in the disk radial direction Z than the end surfaces 84a and 84a. The pair of stepped sections 91 and 91 is concaved in a stepped shape further inside in the disk tangential direction Y than the end surfaces 84a and 84a.

In the pad main body 35 of the outer side pad 14, the pair of convex sections 84 and 84 is slidably supported in the disk axial direction X at the pair of outer side pad support sections 31 and 31, one of which is shown in FIG. 2 and the other of which is shown in FIG. 1, via the outer side portions of the pair of pad guides 18 and 18. In the pad main body 35, when moved in the disk tangential direction Y by rotation of the disk 11 upon braking, the end surface 84a of a downstream side in a moving direction of the end surfaces 84a and 84a abuts the pad guide 18 to be received by the pad guide 18 and the outer side pad support section 31. Accordingly, further movement of the pad main body 35 in the disk tangential direction Y is restricted.

In addition, the inner side pad 13 serving as a common part with the pad main body 35 is supported such that the pair of convex sections 84 and 84 can be slid in the disk axial direction X at the pair of inner side pad support sections 26 and 26, one of which is shown in FIG. 2 and the other is shown in FIG. 1, via the inner sides portions of the pair of pad guides 18 and 18. In the inner side pad 13, when moved in the disk tangential direction Y by the rotation of the disk 11 upon braking, the end surface 84a of the downstream side in the moving direction of the end surfaces 84a and 84a abuts the pad guide 18 to be received by the pad guide 18 and the inner side pad support section 26. Accordingly, further movement of the inner side pad 13 in the disk tangential direction Y is restricted.

Figure 5:
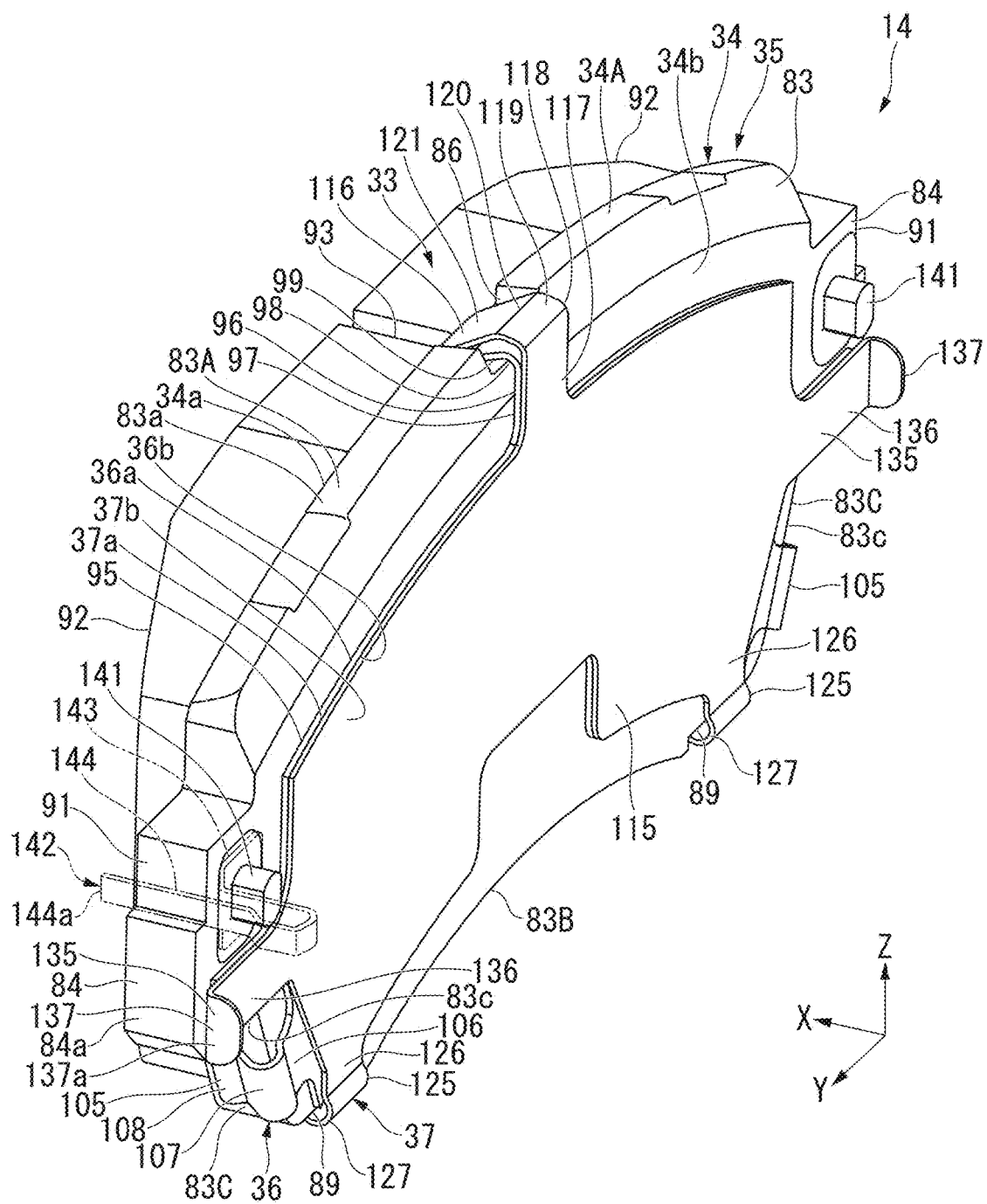
FIG. 5 is a perspective view showing the pad of the disk brake of the first embodiment.

As shown in FIGS. 3 and 5, a pair of chamfers 92 and 92 is formed at the lining 33 at the opposite side of both end sections of the plate 34 in the disk tangential direction Y. In addition, a groove 93 is formed in the lining 33 in the disk radial direction Z at a center in the disk tangential direction Y.

As shown in FIG. 5, the first shim 36 and the second shim 37 locked at the surface 34b side of the plate 34, i.e., a side of the plate 34 opposite to the lining 33, are installed at the pad main body 35 of the outer side pad 14 where the first shim 36 and the second shim 37 are in an overlapping state. Since the first shim 36 and the second shim 37 are formed by punching and bending metal plate members, the entire contact therebetween becomes a contact between the metal surfaces of the first shim 36 and the second shim 37.

The first shim 36 disk tangential direction Y forms a mirror symmetrical shape about a surface which is perpendicular in the disk tangential direction Y and which passes through a center of the first shim 36 in the disk tangential direction Y. The first shim 36 has a cover plate section 95. The cover plate section 95 has a flat plate shape, and covers the surface 34b of the plate 34 of the pad main body 35. The surface 36a and the surface 36b, which are described above, of the first shim 36 are mainly formed at the cover plate section 95. The cover plate section 95 is perpendicular to the disk axial direction X, in other words, parallel to the disk tangential direction Y and parallel to the disk radial direction Z.

In addition, the first shim 36 has an outside hook 96 (a first hook). The outside hook 96 extends outward in the disk radial direction Z from a center in the disk tangential direction Y of an end edge section of the cover plate section 95 and then extends toward the pad main body 35 in the disk axial direction X. The end edge section is located at the outer side of the cover plate section 95 in the disk radial direction Z. The outside hook 96 has a base plate section 97, an intermediate plate section 98, and a front end plate section 99. The base plate section 97 has a flat plate shape, and extends outward in the disk radial direction Z from the cover plate section 95 to form the same plane. The intermediate plate section 98 extends toward the pad main body 35 in the disk axial direction X while being curved from an end edge section of the base plate section 97 opposite to the cover plate section 95. The front end plate section 99 has a flat plate shape, and extends toward an opposite side of the base plate section 97 in the disk axial direction X from the end edge section of the intermediate plate section 98 opposite to the base plate section 97. The front end plate section 99 is inclined to be disposed inside in the disk radial direction Z toward an opposite side of the base plate section 97. The outside hook 96 is installed at a central position of the first shim 36 in the disk tangential direction Y. All of the base plate section 97, the intermediate plate section 98 and the front end plate section 99 are formed in the disk tangential direction Y, and positions thereof in the disk tangential direction Y are constant.

The first shim 36 has a pair of inside hooks 105 and 105. The pair of inside hooks 105 and 105 extends toward both sides in the disk tangential direction Y from inside positions in the disk radial direction Z of both sides of the cover plate section 95 in the disk tangential direction Y, and then extend toward the pad main body 35 in the disk axial direction X. The pair of inside hooks 105 and 105 each has a base plate section 106, an intermediate plate section 107, and a front end plate section 108. The base plate section 106 has a flat plate shape, is flush with the cover plate section 95, and extends outward in the disk tangential direction Y from the cover plate section 95. The intermediate plate section 107 protrudes toward an opposite side of the pad main body 35 in the disk axial direction X from the end edge section of the base plate section 106 opposite to the cover plate section 95, and then is curved to return to the pad main body 35. The front end plate section 108 has a flat plate shape, and extends toward an opposite side of the base plate section 106 in the disk axial direction X from a side of the intermediate plate section 107 which is opposite to the base plate section 106.

In the first shim 36, the outside hook 96 overhangs at the end edge section 83A of the main plate section 83 in the outer circumferential edge section 34A of the plate 34 to be locked to the end edge section 83A. In addition, in the first shim 36, the inside hooks 105 and 105 overhang at side edge sections 83C and 83C having the side surfaces 83c and 83c of both sides of the outer circumferential edge section 34A of the plate 34 in the disk tangential direction Y, and are locked to the side edge sections 83C and 83C. In the outside hook 96, a width dimension of the disk tangential direction Y is made smaller than the width dimension W2 in the disk tangential direction Y, the width dimension W2 being the width dimension of the cutout portion 86 formed at the end edge section 83A of the plate 34 shown in FIG. 4, i.e., a distance between the wall surfaces 86a and 86a, and the outside hook is locked within a range of the cutout portion 86 as shown in FIG. 5.

Figure 6:
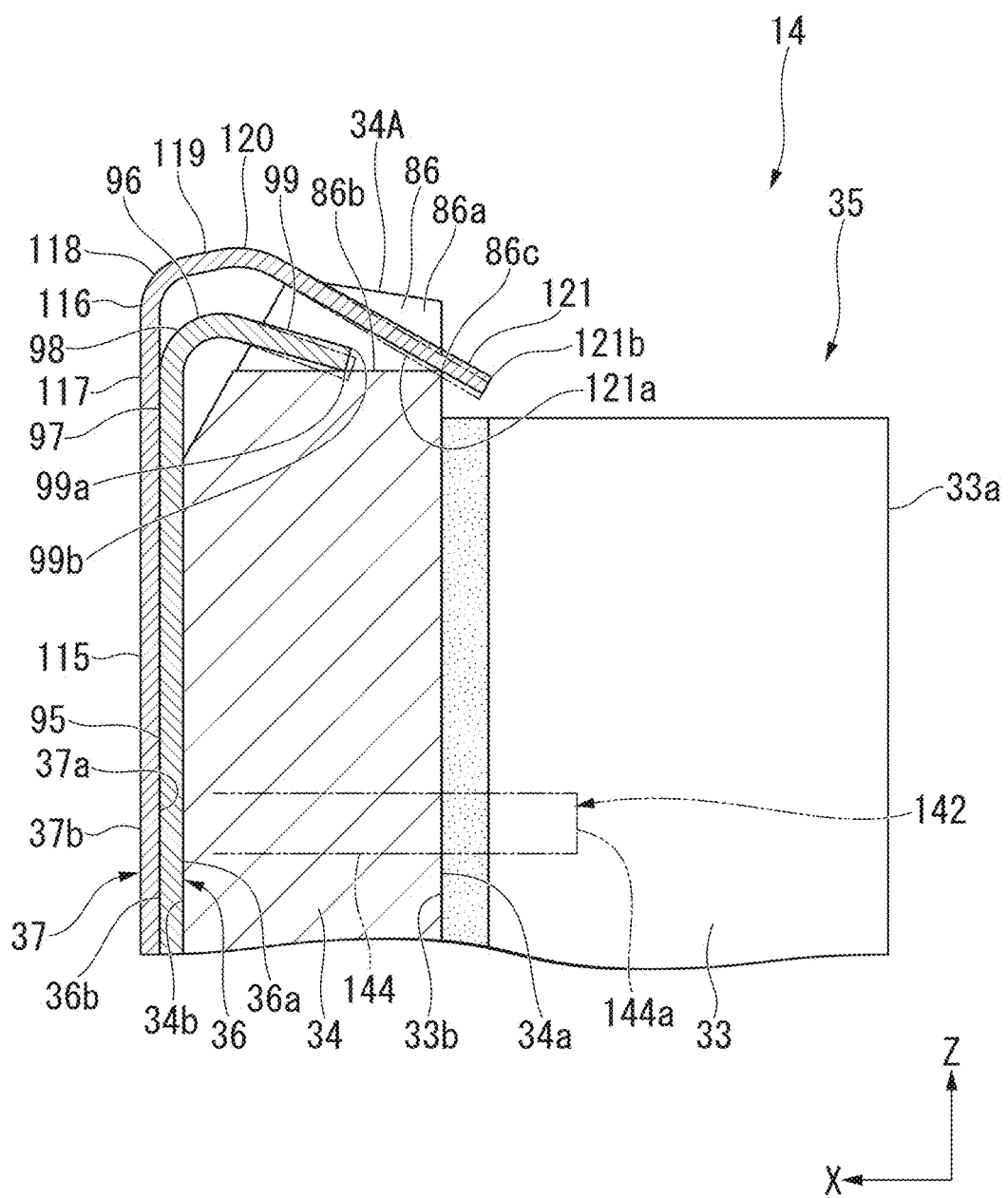
FIG. 6 is a partial cross-sectional view showing the pad of the disk brake of the first embodiment.

In the first shim 36, as shown in FIG. 6, the outside hook 96 comes in contact with the bottom surface 86b of the cutout portion 86 of the plate 34 to be hooked thereto. In addition, in the first shim 36, as shown in FIG. 3, the pair of inside hooks 105 and 105 comes in contact with both of the side surfaces 83c and 83c of the plate 34 in the disk tangential direction Y to be hooked thereto. In the first shim 36 attached to the pad main body 35 as described above, the outside hook 96 is installed at a central position in the disk tangential direction Y of the outer side pad 14.

In a state in which the first shim 36 is attached to the pad main body 35, the outside hook 96 is elastically deformed outward in the disk radial direction Z as shown in FIG. 6 with respect to a natural state shown by two-dot chain lines of FIG. 6. In this state, the outside hook 96 comes in line contact with an intermediate position in the disk axial direction X of the bottom surface 86b of the cutout portion 86 of the plate 34 in a front end corner edge section 99a inside of the end section of the front end plate section 99 opposite to the intermediate plate section 98 in the disk radial direction Z.

As shown in FIG. 4, the second shim 37 forms a mirror symmetrical shape about a surface which is perpendicular to the disk tangential direction Y and which passes through a center of the second shim 37 in the disk tangential direction Y. The second shim 37 has a cover plate section 115. The cover plate section 115 has a flat plate shape, and covers the surface 36b of the first shim 36 opposite to the plate 34 as shown in FIG. 5. The surface 37a and the surface 37b of the second shim 37, which were described above, are mainly formed at the cover plate section 115. The cover plate section 115 is perpendicular to the disk axial direction X. In other words, the cover plate section 115 is parallel to the disk tangential direction Y and parallel to the disk radial direction Z.

In addition, the second shim 37 has an outside hook 116 (a second hook). The outside hook 116 extends outward in the disk radial direction Z from a center in the disk tangential direction Y of an end edge section of the cover plate section 115 and then extends toward the pad main body 35 in the disk axial direction X. The end edge section is located at the outer side of the cover plate section 115 in the disk radial direction Z.

The outside hook 116 has a base plate section 117, a curved plate section 118, an intermediate plate section 119, a curved plate section 120, and a front end plate section 121. The base plate section 117 has a flat plate shape, is flush with the cover plate section 115, and extends outward in the disk radial direction Z from the cover plate section 115. As shown in FIG. 6, the curved plate section 118 extends toward the pad main body 35 in the disk axial direction X while being curved from an end edge section of the base plate section 117 opposite to the cover plate section 115. The intermediate plate section 119 has a flat plate shape, and extends to an opposite side of the base plate section 117 in the disk axial direction X from an end edge section of the curved plate section 118 opposite to the base plate section 117. The curved plate section 120 extends to an opposite side of the base plate section 117 in the disk axial direction X while being curved from an end edge section of the intermediate plate section 119 opposite to the curved plate section 118. The curved plate section 120 is curved to be disposed inward in the disk radial direction Z toward an opposite side of the base plate section 117. The front end plate section 121 has a flat plate shape, and extends to an opposite side of the base plate section 117 in the disk axial direction X from an end edge section of the curved plate section 120 which is opposite to the intermediate plate section 119. The front end plate section 121 extends to be inclined to be disposed inside in the disk radial direction Z toward an opposite side of the base plate section 117.

The outside hook 116 is installed at the central position of the second shim 37 in the disk tangential direction Y as shown in FIG. 4. As shown in FIG. 5, all of the base plate section 117, the curved plate section 118, the intermediate plate section 119, the curved plate section 120 and the front end plate section 121 are formed in the disk tangential direction Y, and positions thereof in the disk tangential direction Y are constant.

The second shim 37 has a pair of inside hooks 125 and 125. The pair of inside hooks 125 and 125 extends inward in the disk radial direction Z from both side positions of the cover plate section 115 in the disk tangential direction Y inside in the disk radial direction Z, and then extend toward the pad main body 35 in the disk axial direction X. The pair of inside hooks 125 and 125 each has a base plate section 126, an intermediate plate section 127, and a front end plate section 128 shown in FIG. 3. The base plate section 126 shown in FIG. 5 has a flat plate shape, is flush with the cover plate section 115, and extends inward in the disk radial direction Z from the cover plate section 115. The intermediate plate section 127 protrudes to an opposite side of the pad main body 35 in the disk axial direction X from an end edge section of the base plate section 126 opposite to the cover plate section 115, and then is curved to return toward the pad main body 35. The front end plate section 128 shown in FIG. 3 extends to an opposite side of the base plate section 126 in the disk axial direction X from an end edge section of the intermediate plate section 127 shown in FIG. 5 opposite to the base plate section 126.

The second shim 37 has a pair of sliding restriction sections 135 and 135. The pair of sliding restriction sections 135 and 135 extends to an opposite side of the cover plate section 115 in the disk tangential direction Y from both side positions of the cover plate section 115 in the disk tangential direction Y, and then protrude to an opposite side of the pad main body 35 in the disk axial direction X at an intermediate position of the cover plate section 115 in the disk radial direction Z. The pair of sliding restriction sections 135 and 135 each has a base plate section 136 and a restriction plate section 137.

The base plate section 136 has a flat plate shape, is flush with the cover plate section 115, and extends outward in the disk tangential direction Y from the cover plate section 115. The restriction plate section 137 has a flat plate shape, and protrudes to an opposite side of the pad main body 35 in the disk axial direction X from an end edge section of the base plate section 136 opposite to the cover plate section 115. The pair of sliding restriction sections 135 and 135 installed at both sides in the disk tangential direction Y of the second shim 37 as described above abuts the support member 12 shown in FIG. 2 to restrict sliding of the second shim 37 in the disk tangential direction Y.

As shown in FIG. 5, in the second shim 37, the outside hook 116 overhangs at the end edge section 83A of the main plate section 83 in the outer circumferential edge section 34A of the plate 34 to be hooked to the end edge section 83A.

In addition, in the second shim 37, the inside hooks 125 and 125 overhang at the stepped sections 89 and 89 inside in the disk radial direction Z in the outer circumferential edge section 34A to be hooked to the stepped sections 89 and 89.

The outside hook 116 of the second shim 37 is formed at a place at which it faces the outside hook 96 of the first shim 36, i.e., a place at which it faces in the disk radial direction Z by overlapping the outside hook 96 and the position in the disk tangential direction Y (outer side of the outside hook 96 in the disk radial direction). In the outside hook 116, a width dimension W1 in the disk tangential direction Y shown in FIG. 4 is made smaller than a width dimension W2 in the disk tangential direction Y, the width dimension W2 being the width dimension of the cutout portion 86 of the plate 34, i.e., a distance between the wall surfaces 86a and 86a, and hooked within a range of the cutout portion 86. A width dimension in the disk tangential direction Y of the outside hook 96 of the first shim 36 shown in FIG. 5 is equal to the width dimension W1 in the disk tangential direction Y of the outside hook 116.

In the second shim 37, as shown in FIG. 6, the outside hook 116 comes in contact with the cutout portion 86 of the plate 34 to be hooked thereto. In addition, in the second shim 37, as shown in FIG. 3, the pair of inside hooks 125 and 125 comes in contact with the stepped surfaces 89b and 89b of the stepped sections 89 and 89 of the plate 34 to be hooked thereto. In the second shim 37 attached to the pad main body 35 as described above, the outside hook 116 is installed at the central position of the outer side pad 14 in the disk tangential direction Y.

As shown in FIG. 6, the outside hook 116 of the second shim 37 is formed to astride the outside hook 96 of the first shim 36 in the disk axial direction X. In the state in which the second shim 37 is attached to the pad main body 35, the outside hook 116 is elastically deformed outward in the disk radial direction Z as shown by a solid line of FIG. 6 with respect to a natural state shown by two-dot chain lines of FIG. 6. Here, in the outside hook 116, a surface 121a of the front end plate section 121 which is disposed at inner side in the disk radial direction Z comes in line contact with corner edge sections 86c (corner sections) which is disposed at the bottom surface 86b side of the cutout portion 86 of the plate 34 and at the lining 33 side. Here, the front end plate section 121 is inclined with respect to the base plate section 117 in the disk axial direction X so that the opposite side of the base plate section 117 is disposed more inner side in the disk radial direction Z. As a result, the outside hook 116 is hooked to the plate 34. In the front end plate section 121, when the cover plate section 115 is moved away from the plate 34 in the disk axial direction X, a force resisting the movement is increased. Accordingly, the outside hook 116 restricts deviation of the second shim 37 from the plate 34. The outside hook 116 of the second shim 37 comes in contact with and is locked to the corner edge section 86c of the plate 34 with which the outside hook 96 of the first shim 36 does not come in contact.

As shown in FIG. 4, in the pair of sliding restriction sections 135 and 135 of the second shim 37, end surfaces 137a and 137a of the pair of restriction plate sections 137 and 137 which is opposite to the base plate sections 136 and 136 is parallel to the end surfaces 84a and 84a of both sides of the pad main body 35 in the disk tangential direction Y. A width dimension W3 between the sliding restriction sections 135 and 135, i.e., a width dimension W3 between the end surfaces 137a and 137a, is set to satisfy the following relation with a width dimension W4 of the end surfaces 84a and 84a of the pad main body 35, the width dimension W1 of the outside hook 116, and the width dimension W2 of the cutout portion 86.

$$(W2-W1) \geq (W4-W3)$$

In the pad main body 35, the end surfaces 84a and 84a in the disk tangential direction Y abut the support member 12 shown in FIG. 2 in the disk tangential direction Y, and movement to either side in the disk tangential direction Y is also restricted. In the second shim 37 shown in FIG. 4, the end surfaces 137a and 137a of the sliding restriction sections 135 and 135 in the disk tangential direction Y abut the support member 12 shown in FIG. 2 in the disk tangential direction Y, and movement to either side in the disk tangential direction Y is also restricted. An abutting position of the support member 12 at which the end surface 84a and the end surface 137a shown in FIG. 4 abut each other is made to match a position in the disk tangential direction Y, while the end surface 84a and the end surface 137a are disposed at the same one side in the disk tangential direction Y.

In addition, an abutting position of the support member 12 at which the end surface 84a and the end surface 137a abut each other is made to match a position in the disk tangential direction Y, while the end surface 84a and the end surface 137a are disposed at the same opposite side in the disk tangential direction Y.

Upon braking, during rotation of the disk 11 shown in FIG. 1, the claw portion 58 of the caliper body 41 of the pressing mechanism 15 abuts the second shim 37 of the outer side pad 14, and the pad main body 35 is pressed against the disk 11 via the first shim 36. Then, the pad main body 35 in contact with the rotating disk 11 moves to an outlet side in a rotation direction of the disk 11 together with the disk 11. In the pad main body 35 moved in this way, the end surface 84a at the outlet side in the rotation direction of the disk 11 shown in FIG. 4 abuts the pad guide 18 of the support member 12 shown in FIG. 2, and is caught by the pad guide 18 and the outer side disposition section 21 of the carrier 17. Accordingly, the carrier 17 receives a braking torque of the outer side pad 14 at the outer side disposition section 21 disposed at the outlet side in the rotation direction of the disk 11. Here, there is a case when the second shim 37 shown in FIG. 4 moves to the outlet side in the rotation direction of the disk 11 together with the pad main body 35. However, since the above-mentioned dimension relation is satisfied, even when the second shim 37 moves to the outlet side in the rotation direction of the disk 11, as the end surface 137a at the outlet side in the rotation direction of the disk 11 abuts the support member 12, abutting of the outside hook 116 with the wall surface 86a of the cutout portion 86 is restricted.

As shown in FIG. 5, protrusion sections 141 and 141 protruding from the surface 34b in an opposite direction of the lining 33 are formed at the plate 34 of the pad main body 35 at positions of convex sections 84 and 84. A contact type sensor 142 configured to come in contact with the disk 11 to generate a warning sound when the lining 33 is abraded and a distance between the disk 11 and the plate 34 in the disk axial direction X arrives at a predetermined value is attached to one of the protrusion sections 141 and 141. The contact type sensor 142 has a fixing section 143 fixed to the plate 34 by caulking the protrusion section 141, and a sensor unit 144 extending from the fixing section 143 to an opposite side of the lining 33 in the disk axial direction X and then returning and extending closer to the lining 33 than the surface 34a by passing through a stepped section 91 of the convex section 84.

As shown in FIG. 6, a front end corner edge section 12 lb located at an outer side in the disk radial direction Z of the front end plate section 121 is disposed closer to the plate 34 than a front end edge section 144a of the sensor unit 144. The front end plate section 121 becomes a front end section position of the outside hook 116 of the second shim 37 in the disk axial direction X. The sensor unit 144 becomes a front end section position of the contact type sensor 142. That is, a position of the front end corner edge section 121b in the disk axial direction X is within a range from a front end corner edge section 99b that becomes a front end section position of the outside hook 96 to the front end edge section 144a that becomes a front end section position of the contact type sensor 142.

A pad unit including a stacked shim disclosed in Japanese Unexamined Patent Application, First Publication No. 2006-46561 has a structure configured to hook a hook of a pad-side shim to a back plate of a pad, and hook a pressing member-side shim to the hook. For this reason, in work of dealing with a pad independently such as exchange work of a pad or the like, in particular, the pressing member-side shim is likely to deviate from the pad-side shim, it should be ensured that the shim does not drop when the work is performed, and working efficiency may be decreased.

On the other hand, in the disk brake 10 of the embodiment, the outside hook 96 of the first shim 36 of the pad 14 overhangs at the end edge section 83A of the main plate section 83 in the outer circumferential edge section 34A of the plate 34 to be hooked to the end edge section 83A. For this reason, resistance in a deviation direction of the outside hook 96 with respect to the plate 34 can be increased, and deviation of the outside hook 96 from the plate 34 can be suppressed. In addition, the outside hook 116 of the second shim 37 is hooked to a part of the plate 34 with which the outside hook 96 does not come in contact. For this reason, resistance in the deviation direction of the outside hook 116 with respect to the plate 34 can be increased, and deviation of the outside hook 116 from the plate 34 can be suppressed. Accordingly, droppage of the first shim 36 and the second shim 37 from the pad 14 can be suppressed. Accordingly, workability when working with the pad 14 can be improved.

In addition, the outside hook 96 and the outside hook 116 are disposed to face each other. For this reason, an engaging structure of the outside hook 96 and the outside hook 116 can be provided, and the cutout portion 86 of the plate 34 disposed therein can be commonly used. Accordingly, low cost can be realized.

In addition, the outside hook 116 is locked to the corner edge section 86c at the lining 33 side of the plate 34. For this reason, resistance in the deviation direction of the outside hook 116 with respect to the plate 34 can be further increased, and deviation from the pad 14 can be further suppressed. Accordingly, droppage of the second shim 37 from the pad 14 can be further suppressed. In addition, the outside hook 116 comes in line contact with the plate 34 because the surface 121a of the front end plate section 121 is locked to the corner edge section 86c of the lining 33 side of the plate 34. Accordingly, sliding resistance of the outside hook 116 in a surface direction of the plate 34 can be decreased. Accordingly, slidability of the second shim 37 in the surface direction of the plate 34 can be increased, and generation of noise upon braking can be suppressed.

In addition, the front end corner edge section 121b disposed at a front end section position of the outside hook 116 in the disk axial direction X is disposed closer to the plate 34 than the front end edge section 144a disposed at a front end section position of the contact type sensor 142. For this reason, contact of the outside hook 116 with the disk 11 before generation of a warning sound by the contact type sensor 142 can be suppressed. Accordingly, damage to the second shim 37 can be suppressed.

In addition, since the outside hook 116 is installed at the central position of the pad 14 in a disk tangential direction 11, the outside hook 116 can be smoothly slid in both directions in the disk tangential direction Y. Accordingly, the second shim 37 can slide smoothly in both directions of the disk tangential direction Y. Accordingly, generation of abnormal sounds can be suppressed regardless of the rotation direction of the disk 11.

In addition, the width dimension W1 in the disk tangential direction Y of the outside hook 116 is made smaller than the width dimension W2 of the cutout portion 86 formed at the outer circumferential edge section 34A of the plate 34. For this reason, the outside hook 116 can be smoothly slid within the range of the cutout portion 86. Accordingly, slidability of the second shim 37 can be increased, and generation of abnormal sounds upon braking can be suppressed.

The width dimension W3 between the sliding restriction sections 135 and 135, the width dimension W4 between the end surfaces 84a and 84a at both sides of the pad 14, which abuts the support member 12, in the disk tangential direction Y, the width dimension W1 of the outside hook 116, and the width dimension W2 of the cutout portion 86 satisfy the relation of $(W2-W1) \geq (W4-W3)$. Accordingly, upon braking, as a sliding restriction section 135 abuts the support member 12 before the outside hook 116 abuts the wall surface 86a of the cutout portion 86, the outside hook 116 can be suppressed from abutting the wall surface 86a of the cutout portion 86. Accordingly, application of a load to the outside hook 116 can be suppressed.

The metal surfaces of the first shim 36 and the second shim 37 come in contact with each other. For this reason, when the outside hook 116 of the second shim 37 is hooked to the outside hook 96 of the first shim 36, the second shim 37 is likely to be further deviated. For this reason, a suppression effect of droppage of the second shim 37 from the pad 14 is increased because the outside hook 96 is hooked to a place at which the outside hook 96 of the plate 34 does not come in contact with the outside hook 116 of the second shim 37.

[Second Embodiment]

Figure 7:
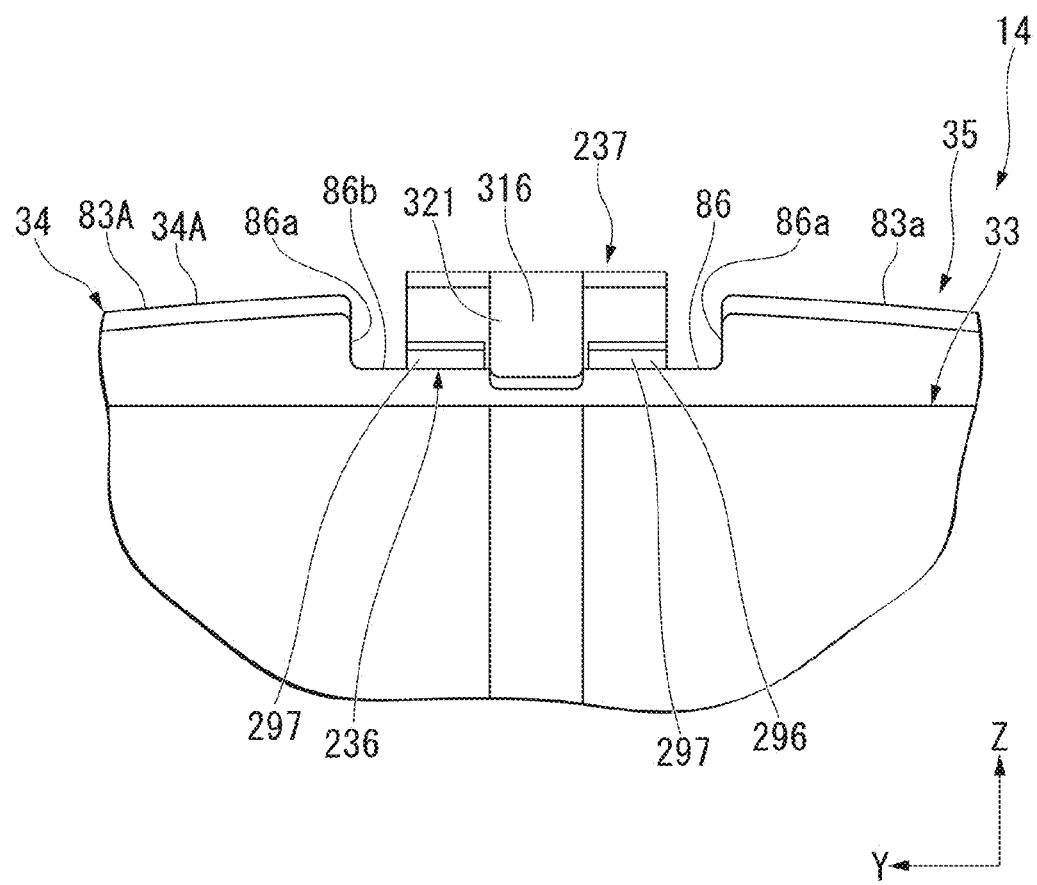
FIG. 7 is a partial front view showing a pad of a disk brake of a second embodiment.

Next, a second embodiment will be described focusing on differences from the first embodiment mainly based on FIG. 7. Further, common parts with the first embodiment will be described with the same names and designated by the same reference numerals.

In the second embodiment, a first shim 236 partially different from the first shim 36 is used, and a second shim 237 partially different from the second shim 37 is used. The first shim 236 is distinguished from that of the first embodiment in that an outside hook 296 (a first hook) is divided into two divided sections 297 and 297 in the disk tangential direction Y with respect to the outside hook 96 of the first shim 36 to be spaced apart from each other in the disk tangential direction Y. In the two divided sections 297 and 297 of the outside hook 296, a shape seen in the disk tangential direction Y is the same as that of the outside hook 96.

The second shim 237 is distinguished from the first embodiment in that an outside hook 316 (a second hook) has a front end plate section 321 having a width smaller than the front end plate section 121 with respect to the outside hook 116. The outside hook 316 has the same shape as the outside hook 116 when seen in the disk tangential direction Y. A width of the front end plate section 321 of the outside hook 316 is smaller than a width of a gap between the divided sections 297 and 297 of the outside hook 296, and the front end plate section 321 of the outside hook 316 is disposed between the divided sections 297 and 297.

According to the second embodiment, the outside hook 316 is disposed between the two divided sections 297 and 297 of the outside hook 296. For this reason, interference between the outside hook 296 and the outside hook 316 can be suppressed. Accordingly, a degree of freedom in shape of the outside hook 296 and the outside hook 316 is increased.

[Third Embodiment]

Figure 8:
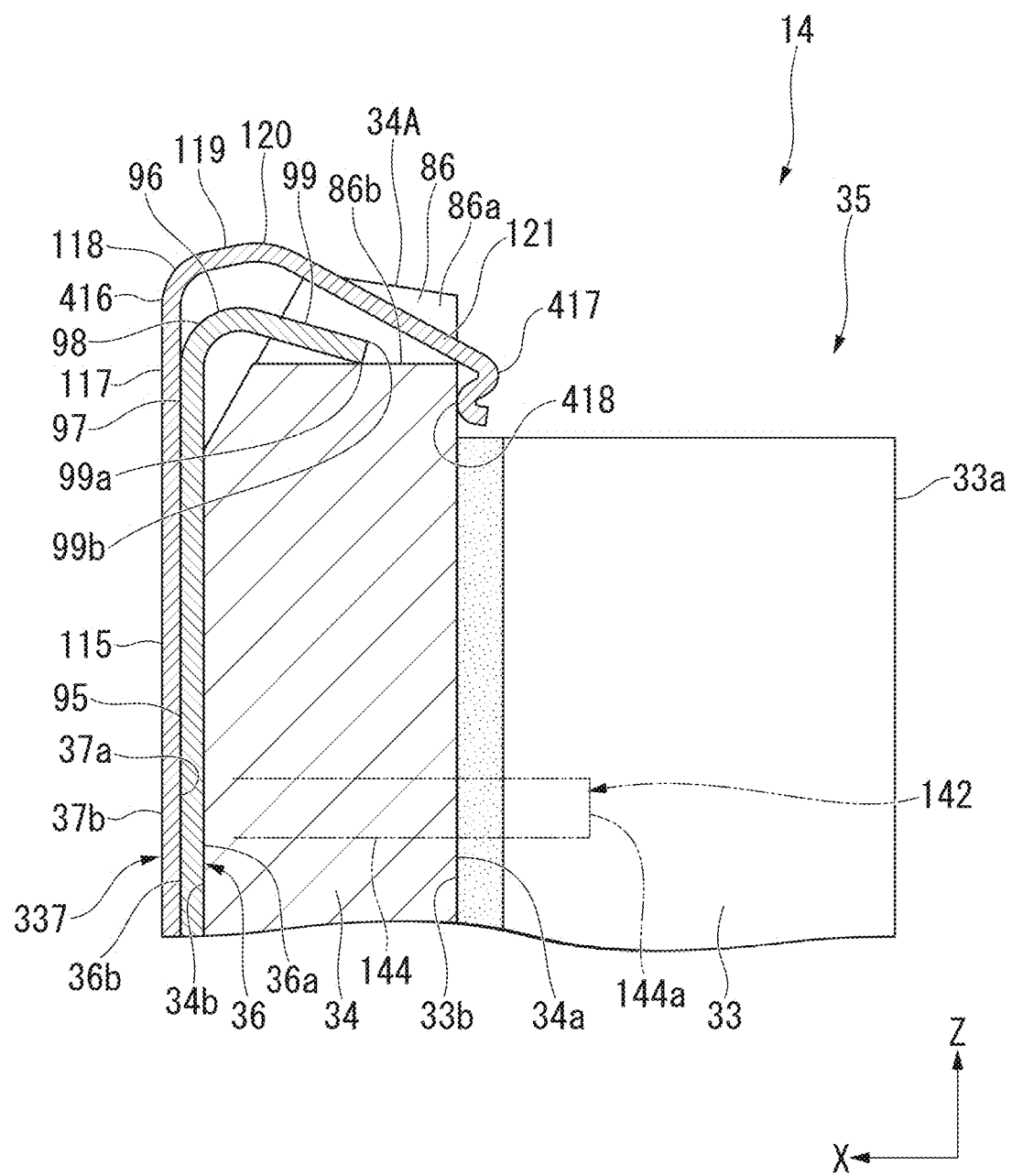
FIG. 8 is a partial cross-sectional view showing a pad of a disk brake of a third embodiment.

Next, a third embodiment will be described focusing on differences from the first embodiment mainly based on FIG. 8. Further, common parts with the first embodiment will be described with the same names and designated by the same reference numerals.

In the third embodiment, a second shim 337 partially different from the second shim 37 is used. The second shim 337 has an outside hook 416 (a second hook) partially different from the outside hook 116 of the second shim 37. The outside hook 416 has a curved plate section 417 and a curved plate section 418, in addition to the base plate section 117, the curved plate section 118, the intermediate plate section 119, the curved plate section 120 and the front end plate section 121 which are similar with the outside hook 116. The curved plate section 417 has a shape that returns toward the inside in the disk radial direction Z and toward the plate 34 in the disk axial direction X while being curved from the end edge section of the front end plate section 121 opposite to the curved plate section 120. The curved plate section 418 has a shape that returns toward the inside in the disk radial direction Z and toward an opposite side of the plate 34 in the disk axial direction X while being curved from the end edge section of the curved plate section 417 opposite to the front end plate section 121. Then, the outside hook 416 is formed to astride the outside hook 96 in the disk axial direction X, and the curved plate section 418 abuts the surface 34a of the plate 34 at the lining 33 side to be hooked thereto.

According to the third embodiment, the outside hook 416 is hooked to the surface 34a of the plate 34 at the lining 33 side. For this reason, resistance in the deviation direction with respect to the plate 34 of the outside hook 416 can be further increased, and deviation of the outside hook 416 from the plate 34 can be further suppressed.

Further, while the embodiment in which the outside hook 96 (the first hook) of the first shim 36 and the outside hook 116 (the second hook) of the second shim 37 are installed at a central position of the outer side pad 14 in the disk tangential direction Y has been described, the embodiment is not limited thereto. For example, two sets of the first and second hooks may be installed, and the central positions in the disk tangential direction Y may be symmetrically disposed in pairs at left and right sides. In addition, while the first shim 36 formed of a metal material has been described, rubber may be adhered to a surface thereof.

The above-mentioned embodiment includes a support member disposed so as to astride an outer circumferential side of a disk, a pair of pads supported by the support member and disposed to face both surfaces of the disk, and a pressing mechanism configured to press the pair of pads against the disk, each of the pads includes a lining configured to contact with the disk, a plate installed at a surface of the lining which is opposite to the disk, a first shim installed at a surface of the plate which is opposite to the lining, and a second shim installed at a surface of the first shim which is opposite to the plate, a first hook overhanging at an outer circumferential edge section of the plate and hooked to the outer circumferential edge section of the plate is formed at the first shim, a second hook is formed at the second shim at a place at which it faces the first hook (at an outer side of the first hook in a disk radial direction), and the second hook is configured to be hooked to a part of the plate with which the first hook does not come in contact.

In this way, the first hook of the first shim overhangs at the outer circumferential edge section of the plate to be hooked to the outer circumferential edge section. For this reason, resistance in the deviation direction of the first hook with respect to the plate can be increased, and deviation of the first hook from the plate can be suppressed. In addition, the second hook of the second shim is hooked to a part of the plate with which the first hook does not come in contact. For this reason, resistance in the deviation direction of the second hook with respect to the plate can be increased, and deviation of the second hook from the plate can be suppressed. That is, as a coefficient of friction therebetween when the first hook is hooked to the outer circumferential edge section of the plate is larger than a coefficient of friction therebetween when the first hook is hooked to the second hook, deviation of the second hook from the plate can be suppressed. Accordingly, droppage of the first shim and the second shim from the pad can be suppressed. In addition, as the first hook and the second hook are disposed to face each other, an engaging structure of the first hook and the second hook can be provided, and the structure can be partially used in common Accordingly, cost reduction can be achieved.

In addition, the second hook is formed to astride the first hook, and hooked to a corner section of the plate at the lining side. Accordingly, resistance in the deviation direction of the second hook with respect to the plate can be increased, and deviation from the plate can be further suppressed. Accordingly, droppage of the second shim from the pad can be further suppressed. In addition, since the second hook is hooked to the corner section at the lining side of the plate, the second hook comes in line contact with the plate.

Accordingly, a sliding resistance of the second hook in the surface direction of the plate can be decreased. Accordingly, slidability of the second shim in the surface direction of the plate can be increased, and generation of abnormal sounds upon braking can be suppressed.

The second hook is formed to astride the first hook, and hooked to a surface of the plate at the lining side. Accordingly, resistance in the deviation direction of the second hook with respect to the plate can be further increased, and deviation from the plate can be further suppressed.

The first hook is divided into two divided sections, and the second hook is disposed between the two divided sections. Accordingly, the second hook is disposed between the two divided sections of the first hook. For this reason, interference between the first hook and the second hook can be suppressed. Accordingly, a degree of geometric freedom of the first hook and the second hook can be increased.

The contact type sensor is installed at the plate and is configured to come in contact with the disk to generate a warning sound when the lining is abraded and a distance between the disk and the plate in the disk axial direction arrives at a predetermined value, and the front end section position of the second hook in the disk axial direction is disposed closer to the plate than a front end section position of the contact type sensor. Accordingly, contact of the second hook with the disk before the contact type sensor generates a warning sound can be suppressed. Accordingly, damage to the second shim can be suppressed.

The second hook is installed at a central position of the pad in a disk tangential direction. Accordingly, the second hook can be appropriately slid in both directions in the disk tangential direction. Accordingly, the second shim can be appropriately slid in both directions in the disk tangential direction. Accordingly, generation of abnormal sounds upon braking can be suppressed regardless of the rotation direction of the disk.

A width dimension W1 of the second hook in the disk tangential direction is set to be smaller than a width dimension W2 of a cutout portion in the disk tangential direction, and the second hook is hooked within a range of the cutout portion, the cutout portion being formed at the outer circumferential edge section of the plate. Accordingly, the second hook can be appropriately slid within the range of the cutout portion. Accordingly, slidability of the second shim can be increased, and generation of abnormal sounds upon braking can be suppressed.

Sliding restriction sections configured to abut the support member in the disk tangential direction and configured to restrict sliding of the second shim are installed at both sides of the second shim in the disk tangential direction, and a width dimension W3 between the sliding restriction sections, a width dimension W4 between the abutting surfaces formed in the disk tangential direction at both sides of the pad abut with the support member in the disk tangential direction, the width dimension W1 of the second hook, and the width dimension W2 of the cutout portion satisfy a relation of (W2−W1)≥(W4−W3). Accordingly, as the sliding restriction sections abut the support member before the second hook abuts the wall surface of the cutout portion, the second hook can be suppressed from abutting the wall surface of the cutout portion. Accordingly, application of the load to the second hook can be suppressed.

The metal surfaces of the first shim and the second shim come in contact with each other. Accordingly, since the second shim is more easily deviated from the first shim, a suppressed effect of droppage of the second shim from the pad can be increased by hooking the second hook of the second shim to a part of the plate with which the first hook does not come in contact.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A disk brake comprising:
   a support member disposed so as to astride an outer circumferential side of a disk;
   a pair of pads supported by the support member and disposed to face surfaces of the disk; and
   a pressing mechanism configured to press the pair of pads against the disk,
   wherein at least one of the pair of pads comprises:
   a lining configured to contact with the disk;
   a plate installed at a surface of the lining which is opposite to the disk;
   a first shim installed at a surface of the plate which is opposite to the lining; and
   a second shim installed at a surface of the first shim which is opposite to the plate,
   a first hook configured to hook the first shim to the plate by overhanging at an outer circumferential edge section of the plate and by abutting with the outer circumferential edge section is formed at the first shim,
   a second hook is formed at a part of the second shim which is positioned at an outer side of the first hook in a disk radial direction, and
   the second hook is formed to extend over the first hook and is configured to hook the second shim to a corner section or a surface of the plate at the lining side by abutting with the outer circumferential edge section of the plate at a position closer to the lining compared to a position where the first hook abuts the plate.

2. The disk brake according to claim 1,
   wherein the first hook is divided into two divided sections, and
   the second hook is disposed between the two divided sections.

3. The disk brake according to claim 1,
   wherein a contact type sensor is installed at the plate and is configured to come in contact with the disk to generate a warning sound when the lining is abraded and a distance between the disk and the plate in an disk axial direction arrives at a predetermined value, and
   a front end section position of the second hook in the disk axial direction is disposed closer to the plate than a front end section position of the contact type sensor.

4. The disk brake according to claim 1,
   wherein the second hook is installed at a central position of the pad in a disk tangential direction.

5. The disk brake according to claim 4,
   wherein a width dimension W1 of the second hook in the disk tangential direction is set to be smaller than a width dimension W2 of a cutout portion in the disk tangential direction, and the second hook is hooked within a range of the cutout portion, the cutout portion being formed at the outer circumferential edge section of the plate.

6. The disk brake according to claim 5,
   wherein sliding restriction sections configured to abut the support member in the disk tangential direction and configured to restrict sliding of the second shim are installed at both sides of the second shim in the disk tangential direction, and
   wherein a width dimension W3 between the sliding restriction sections, a width dimension W4 between abutting surfaces formed in the disk tangential direction at both sides of the pad abutting with the support member in the disk tangential direction, the width dimension W1 of the second hook, and the width dimension W2 of the cutout portion satisfy a relation of $$(W2-W1) \geq (W4-W3).$$

7. The disk brake according to claim 6,
wherein metal surfaces of the first shim and the second shim come in contact with each other.

8. A pad comprising:
a lining configured to contact with a disk;
a plate installed at a surface of the lining which is opposite to the disk;
a first shim installed at a surface of the plate which is opposite to the lining; and
a second shim installed at a surface of the first shim which is opposite to the plate,
wherein a first hook configured to hook the first shim to the plate by overhanging at an outer circumferential edge section of the plate and by abutting with the outer circumferential edge section is formed at the first shim,
a second hook is formed at the second shim which is positioned at an outer side of the first hook in a disk radial direction, and
the second hook is formed to extend over the first hook and is configured to hook the second shim to a corner section or a surface of the plate at the lining side by abutting with the outer circumferential edge section of the plate at a position closer to the lining compared to a position where the first hook abuts the plate.

9. A pair of shims for covering a plate which is installed at a surface of a lining, the lining being configured to be in contact with the disk and the surface of the lining being opposite to a disk, wherein
the pair of shims having a first shim installed at a surface of the plate which is opposite to the lining, and a second shim installed at a surface of the first shim which is opposite to the plate,
a first hook configured to hook the first shim to the plate by overhanging at an outer circumferential edge section of the plate and by abutting with the outer circumferential edge section is formed at the first shim,
a second hook is formed at the second shim which is located at an outer side of the first hook in a disk radial direction, and
the second hook is formed to extend over the first hook and is configured to be hook the second shim to a corner section or a surface of the plate at the lining side by abutting with the outer circumferential edge section of the plate at a position closer to the lining compared to a position where the first hook abuts the plate.

10. The pad according to claim 8,
wherein the first hook is divided into two divided sections, and
the second hook is disposed between the two divided sections.

11. The pad according to claim 8,
wherein a contact type sensor is installed at the plate and is configured to come in contact with the disk to generate a warning sound when the lining is abraded and a distance between the disk and the plate in the disk axial direction arrives at a predetermined value, and
a front end section position of the second hook in the disk axial direction is disposed closer to the plate than the front end section position of the contact type sensor.

12. The pad according to claim 8,
wherein the second hook is installed at a central position of the pad in the disk tangential direction.

13. The pad according to claim 12,
wherein the width dimension $W1$ of the second hook in the disk tangential direction is set to be smaller than the width dimension $W2$ of the cutout portion in the disk tangential direction, and the second hook is hooked within a range of the cutout portion, the cutout portion being formed at the outer circumferential edge section of the plate.

14. The pad according to claim 13,
wherein sliding restriction sections configured to abut the support member in the disk tangential direction and configured to restrict sliding of the second shim are installed at both sides of the second shim in the disk tangential direction, and
wherein a width dimension $W3$ between the sliding restriction sections, a width dimension $W4$ between abutting surfaces formed in the disk tangential direction at both sides of the pad abutting with the support member in the disk tangential direction, the width dimension $W1$ of the second hook, and the width dimension $W2$ of the cutout portion satisfy a relation of $$(W2-W1) \geq (W4-W3).$$

15. The pad according to claim 14,
wherein metal surfaces of the first shim and the second shim come in contact with each other.

* * * * *